US012779911B2

(12) United States Patent
Liu

(10) Patent No.: US 12,779,911 B2
(45) Date of Patent: Nov. 3, 2026

(54) CHECK DEVICE

(71) Applicant: Autel Intelligent Technology Corp., Ltd., Shenzhen (CN)

(72) Inventor: Peng Liu, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 690 days.

(21) Appl. No.: 18/256,053

(22) PCT Filed: Nov. 24, 2021

(86) PCT No.: PCT/CN2021/132909
§ 371 (c)(1),
(2) Date: Jan. 3, 2024

(87) PCT Pub. No.: WO2022/121688
PCT Pub. Date: Jun. 16, 2022

(65) Prior Publication Data

US 2024/0227459 A1 Jul. 11, 2024

(30) Foreign Application Priority Data

Dec. 8, 2020 (CN) ......................... 202011445026.9

(51) Int. Cl.
*B60C 11/24* (2006.01)
*B60T 17/22* (2006.01)
(Continued)

(52) U.S. Cl.
CPC .......... *B60C 11/246* (2013.01); *B60T 17/221* (2013.01); *F16D 65/0043* (2013.01);
(Continued)

(58) Field of Classification Search
CPC .. B60C 11/246; B60T 17/221; F16D 65/0043; F16D 66/028; G01B 5/0028; G01M 17/027; G01N 21/01
See application file for complete search history.

(56) References Cited

U.S. PATENT DOCUMENTS 3,269,019 A * 8/1966 Krohn ...................... G01B 3/28 33/203.11
5,369,602 A * 11/1994 Naas ...................... G01B 7/315 33/203.18
(Continued)

FOREIGN PATENT DOCUMENTS

CN 105683923 A 6/2016
CN 110914636 A 3/2020
(Continued)

OTHER PUBLICATIONS

International Search Report of PCT Patent Application No. PCT/CN2021/132909 issued on Feb. 7, 2022.
(Continued)

*Primary Examiner* — Jill E Culler
(74) *Attorney, Agent, or Firm* — Andrew C. Cheng

(57) ABSTRACT

A check device includes a check device body; and a base, comprising a first base body, a second base body, and a locking mechanism. The check device body is mounted to the first base body; part of the second base body can be accommodated in an inner cavity of the first base body; the second base body can move with respect to the first base body; part of the second base body can be accommodated in or extend out of the inner cavity of the first base body; and the locking mechanism is used for locking the second base body with respect to the first base body, such that the part of the second base body is accommodated in the inner cavity of the first base body, and unlocking the second base body with respect to the first base body, such that the part of the second
(Continued)

base body extends out of the inner cavity of the first base body. The check device can be used for checking a brake disc of a vehicle and can also check a tread surface of a tire, and is stable and effective.

13 Claims, 23 Drawing Sheets

(51) Int. Cl.

| | |
|---|---|
| ***F16D 65/00*** | (2006.01) |
| ***F16D 66/02*** | (2006.01) |
| ***G01B 5/00*** | (2006.01) |
| ***G01M 17/02*** | (2006.01) |
| ***G01N 21/01*** | (2006.01) |

(52) U.S. Cl.
CPC ......... *F16D 66/028* (2013.01); *G01B 5/0028* (2013.01); *G01M 17/027* (2013.01); *G01N 21/01* (2013.01)

(56) References Cited

U.S. PATENT DOCUMENTS 5,870,835 A 2/1999 Stieff
6,694,832 B1 * 2/2004 Gleeson .................. G01B 3/28 73/866.5
8,276,251 B2 * 10/2012 Mitchell ............ B25B 27/0035 269/96

FOREIGN PATENT DOCUMENTS

CN 112557064 A 3/2021
FR 2665255 A1 1/1992
WO 2018172991 A1 9/2018

OTHER PUBLICATIONS

The extended European search report of EP application No. 21902395.9 issued on Mar. 12, 2024.

* cited by examiner

CHECK DEVICE

CROSS-REFERENCE TO RELATED APPLICATIONS

The present application is the National Stage application for PCT patent application Serial No. PCT/CN2021/132909, filed on Nov. 24, 2021, which claims priority to the Chinese patent application No. 202011445026.9 entitled "check device" filed on Dec. 8, 2020, to the China National Intellectual Property Administration, the entire contents of which are incorporated herein by reference.

TECHNICAL FIELD

The present application relates to the field of vehicle state checking, in particular to a check device.

BACKGROUND OF THE INVENTION

The automobile tire tread checking and brake disc detector need to have one base to ensure that the instrument can be placed on the tire and brake disc of the automobile steadily during the detection. At the same time, there are differences between the two scenes of tire tread detection and brake disc detection. When the tire tread is detected, the base needs to be as large as possible to ensure smooth support; while when the brake disc is detected, the instrument needs to pass through the hub spoke and the width of the brake disc is small, which requires that the size of the base should not be too large, otherwise it cannot be detected. Therefore, the base of the instrument needs to be designed to be compatible, and the existing structural solution on the market is realized by replacing a base with a different size, which makes the operation complicated. Since the replaced base is movable, there is also the problem of unstable support, and at the same time, the externally hung base will also affect the integrity of the appearance of the instrument, which is not quite appealing to the eye.

In implementing the process of the present invention, the inventors of the present invention have found that: it is necessary to provide a structural design solution that can realize two kinds of compatible scenes of tire tread detection and brake disc detection, and realize the integration with the instruments at the same time.

SUMMARY OF THE INVENTION

Embodiments of the present invention are intended to provide a check device that enables a product to be in two different scenarios of tire tread detection and brake disc detection without having to replace the base, thereby ensuring the stability of the base support and the accuracy of the measurement.

The embodiments of the present invention solve the technical problem thereof by using the following technical solutions: providing a check device comprising: a check device body; and a base comprising a first base body, a second base body, and a locking mechanism, wherein the check device body is mounted to the first base body;

- wherein the first base body has a hollow structure, and at least part of the second base body can be accommodated in an inner cavity of the first base body;
- the first base body comprises a first sliding member, the second base body comprises a second sliding member, the first sliding member cooperates with the second sliding member to move the second base body with respect to the first base body, and at least part of the base body can be accommodated in or can extend out of the inner cavity of the first base body;
- the locking mechanism is used for locking the second base body with respect to the first base body such that at least part of the second base body is accommodated in the inner cavity of the first base body, and unlocking the second base body with respect to the first base body such that the at least part of the second base body extends out of the inner cavity of the first base body.

In some embodiments, the first base body comprises an upper cover, and the upper cover is covered on the first sliding member;

- the locking mechanism comprises a track groove, a rotating groove, a rotating shaft, and a locking block;
- wherein the track groove is provided on an inner surface of the upper cover, the upper cover extends into the track groove with a locking table, the rotating groove is provided on the second sliding member, one end of the rotating shaft is accommodated in the rotating groove, the rotating shaft can rotate with respect to the rotating groove, the locking block is fixed to the other end of the rotating shaft, the locking block is provided with a locking groove, the locking block is accommodated in the track groove, and when the second base body moves with respect to the first base body, the locking block can move along the track groove and rotate;
- when the second base body is accommodated in the inner cavity of the first base body and the locking block is inclined with respect to the track groove and the locking groove is engaged with the locking table, the locking mechanism locks the first base body and the second base body, and the second base body cannot protrude from the inner cavity of the first base body; when the locking groove is disengaged from the locking table and a notch of the locking groove is rotated to a direction deviating from the locking table, the first base body and the second base body are unlocked so that the second body can protrude from the inner cavity of the first body base.

In some embodiments, the track groove includes a guide groove and a rotating groove;

- an end of the guide groove is in communication with an end of the rotating groove, the width of the rotating groove is greater than the width of the guide groove, and the locking table is formed at a connection of the rotating groove and the guide groove. In some embodiments, the side face of the guide groove is an inclined plane.

In some embodiments, the number of the locking grooves is two, and the two locking grooves are respectively located at two ends of the locking block.

In some embodiments, a boss is provided at a bottom of the rotating groove, and when the locking block moves from the extreme extending position to the bottom of the rotating groove, the boss abuts against a side wall of the locking groove.

In some embodiments, the locking mechanism further comprises an elastic part;

- one end of the elastic part abuts against the bottom of the first sliding member, and the other end of the elastic part abuts against one end of the second sliding member accommodated in the inner cavity of the first base body.

In some embodiments, an end face of one end of the second base body accommodated in the inner cavity of the first base body is provided with a fixing column, and the other end of the elastic part is sleeved on the fixing column.

In some embodiments, the support plate is mounted to the other end of the second base body, and four end faces of the support plate are flush with four side faces of the first sliding member, respectively.

In some embodiments, the check device body comprises a hand-held housing, a photoelectric assembly, an image capturing assembly, and a control unit;

the control unit, the photoelectric assembly, and the image capturing assembly are all arranged on the hand-held housing, the control unit is electrically connected to the photoelectric assembly and the image capturing assembly respectively, and one end of the hand-held housing is mounted to the first base body;

wherein the first base body and the second base body are used for abutting against a brake disc or the tire, the photoelectric assembly is used for projecting light onto the brake disc or the tire, the image capturing assembly is used for capturing an image containing the light on the brake disc or the tire, and the control unit is used for recognizing information about the brake disc or the tire according to the image.

In some embodiments, the first base body is provided with a mounting groove in which one end of the hand-held housing is accommodated.

In some embodiments, the second base body is further provided with an accommodating cavity;

the check device further comprises a first magnetic absorbing member and a second magnetic absorbing member, wherein the first magnetic absorbing member is mounted in an accommodating cavity, the second magnetic absorbing member is mounted to one end of the hand-held housing, and one end of the hand-held housing is accommodated in the mounting groove, the first magnetic absorbing member and the second magnetic absorbing member being attracted to each other.

The invention has the following beneficial effects.

An embodiment of the present invention provides a check device capable of checking two different use scenarios of a tire tread and a brake disc without replacing the base, thereby ensuring the stability of the base support and the accuracy of the check device measurement.

BRIEF DESCRIPTION OF DRAWINGS

One or more embodiments are exemplified by the drawings in the accompanying drawings corresponding thereto. These exemplified descriptions do not constitute a limitation on the embodiments. Elements in the drawings having the same reference number designations are illustrated as similar elements, and unless otherwise particularly stated, the drawings do not constitute a proportional limitation.

DETAILED DESCRIPTION OF THE INVENTION

Figure 1:
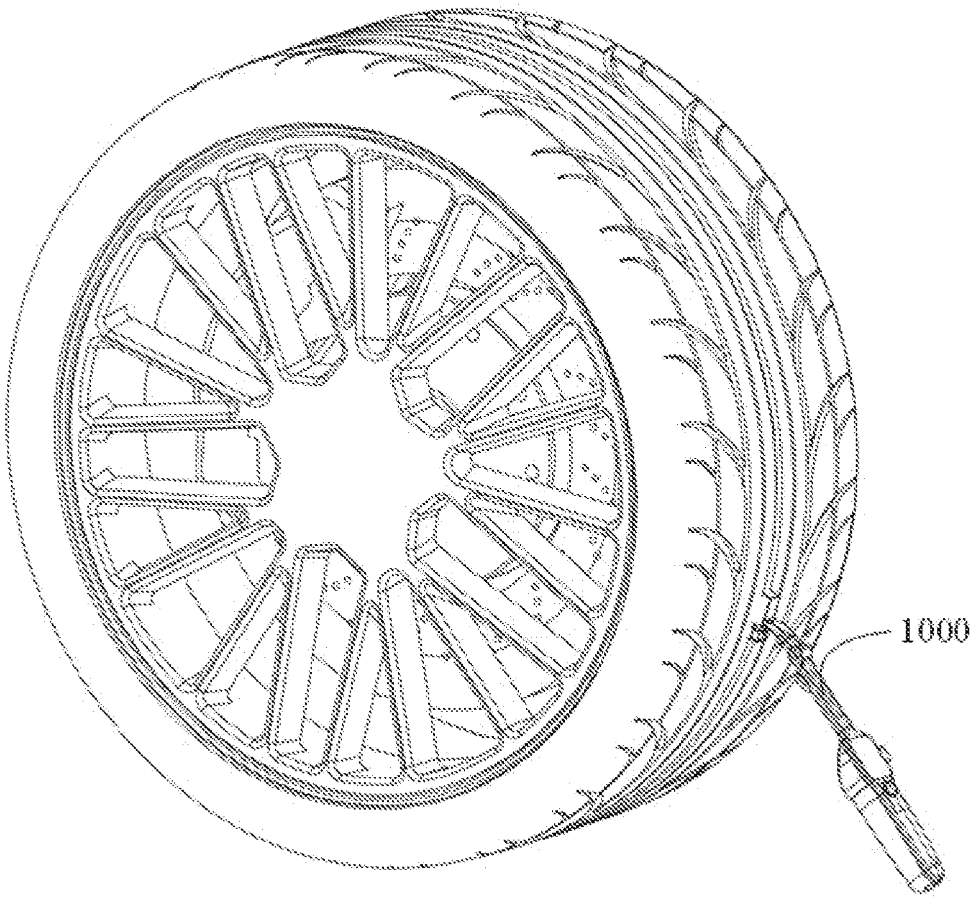
FIG. 1 is a graph showing an application scenario in which a tire tread surface is measured by a check device according to an embodiment of the present invention.

In order to make the present invention readily understood, a more detailed description of the present invention will be rendered with reference to the appended drawings and specific embodiments. It should be noted that when an element is referred to as being "secured" to another element, it can be directly on the other element or one or more intervening elements may be present therebetween. When one element is referred to as being "connected" to another element, it can be directly connected to the other element or one or more intervening elements may be present therebetween. In the description, the orientation or positional relationships indicated by the terms used herein "up", "down", "inside", "outside", "vertical", "horizontal" etc. are based on the orientation or positional relationship shown in the drawings, and are only for the convenience of describing the invention and simplifying the description, rather than indicating or implying that the referred device or element must have a specific orientation, or be constructed and operated in a specific orientation, and therefore cannot be construed as a limitation of the present invention. Furthermore, the terms "first", "second", etc. are only used for descriptive purposes and are not to be construed as indicating or implying relative importance.

Unless defined otherwise, all technical and scientific terms used in the specification have the same meaning as commonly understood by one of ordinary skill in the art to which the present invention belongs. The terminology used in the description of the present invention is for the purpose of describing specific embodiments only and is not intended to limit the present invention. As used herein, the term "and/or" includes any and all combinations of one or more of the associated listed items.

Furthermore, the technical features involved in the different embodiments of the present invention described below can be combined with each other as long as they do not conflict with each other.

Figure 2:
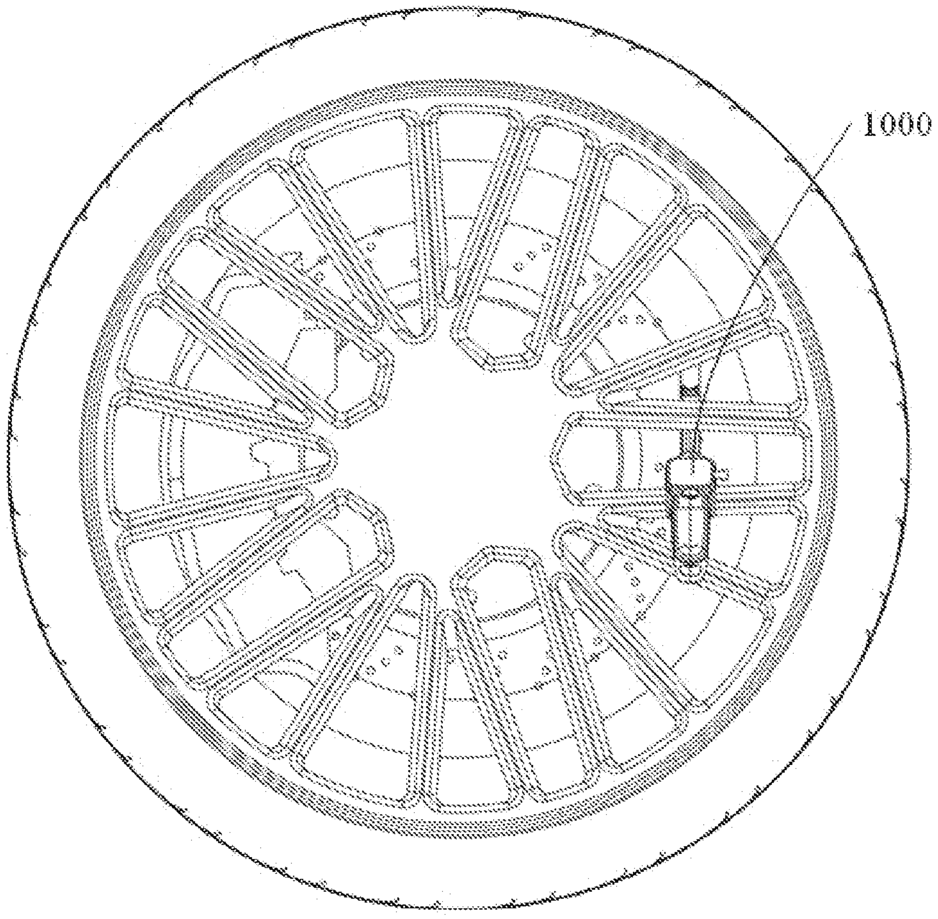
FIG. 2 is a graph showing an application scenario in which a check device measures a brake disc according to an embodiment of the present invention.

Referring to FIG. 1 and FIG. 2 together, it is an application scenario of a check device 1000 provided by the embodiment of the invention. The check device is used to check a brake disc and a tire tread surface of a vehicle.

Figure 3:
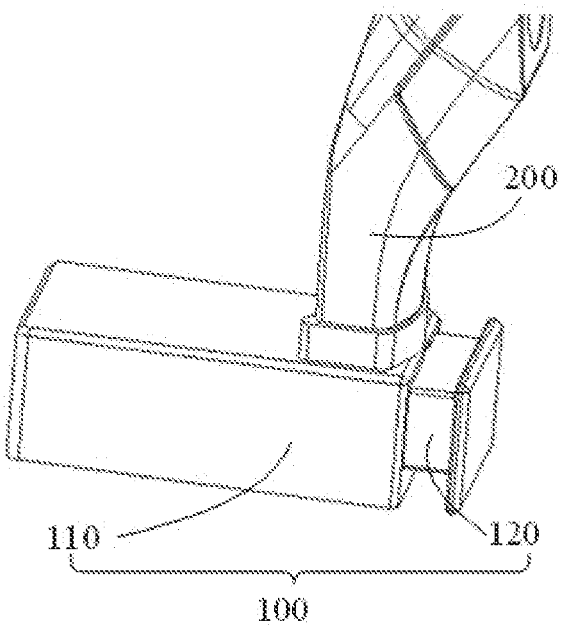
FIG. 3 is a schematic structural diagram of a check device for measuring a tire tread surface according to an embodiment of the present invention.
Figure 4:
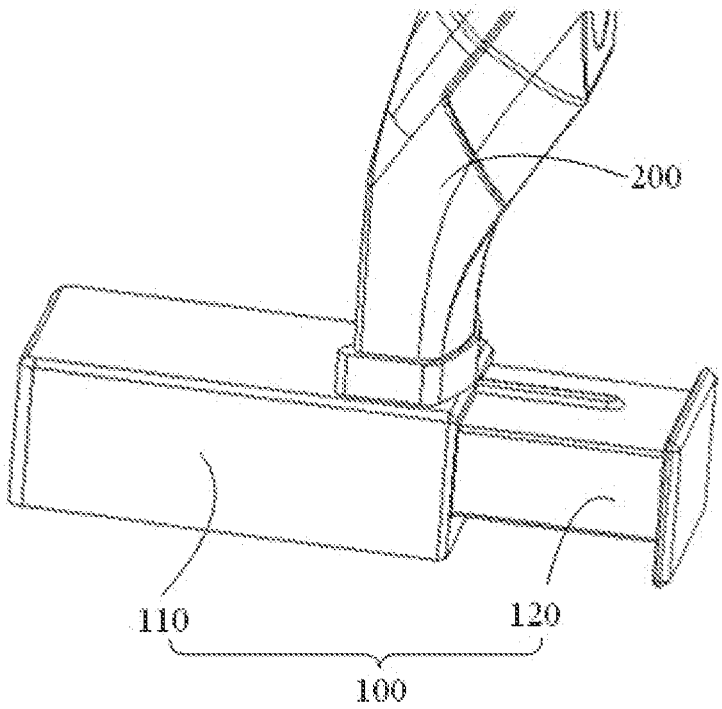
FIG. 4 is a schematic structural diagram of a check device for measuring a brake disc according to an embodiment of the present invention.

Referring to FIGS. 3 and 4 together, the check device 1000 includes a base 100 and a check device body 200. The check device body 200 is mounted to the base 100, the base is used to abut against the brake disc or the tire, and the check device body 200 is used to detect the brake disc and tire tread surface of a vehicle.

It could be understood that the check device body 200 may be fixedly mounted to the base 100 to ensure the stability of measurements of the check device, and the check device body 200 may also be removably mounted to the base 100 to facilitate servicing of the check device 100.

The base 100 is telescopic to cooperate with the use of the check device body 200. For example, the scenarios where the check device body 200 is used for checking a brake disc of the vehicle when the base 100 is in an extended state; the check device body 200 is used for checking a tread surface of the tire when the base 100 is in a contracted state.

Figure 5:
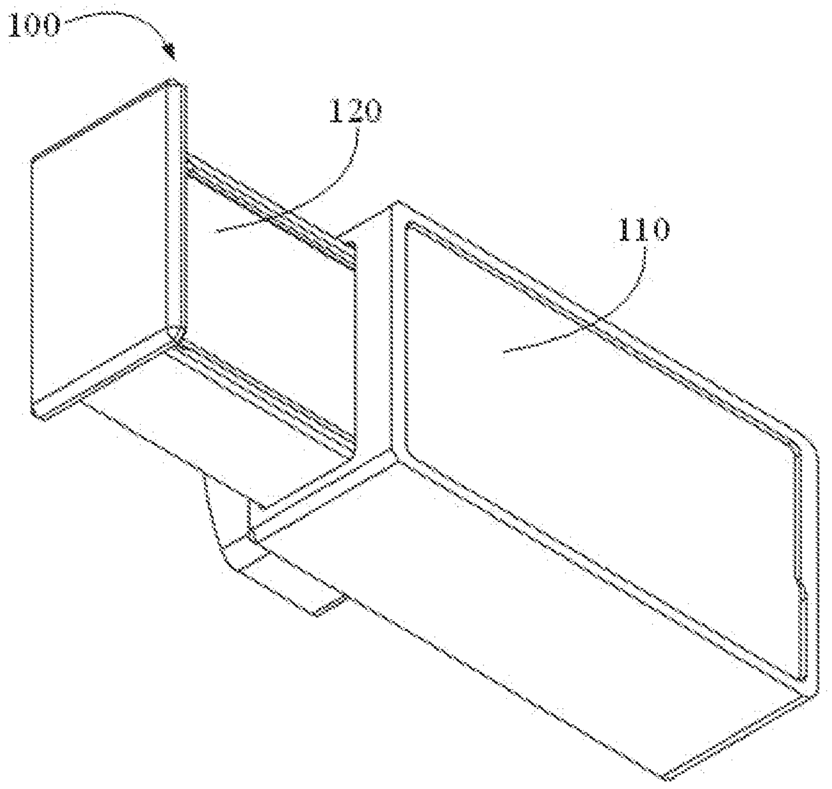
FIG. 5 is a schematic structural diagram of a check device with a base in an extended state according to an embodiment of the present invention.
Figure 6:
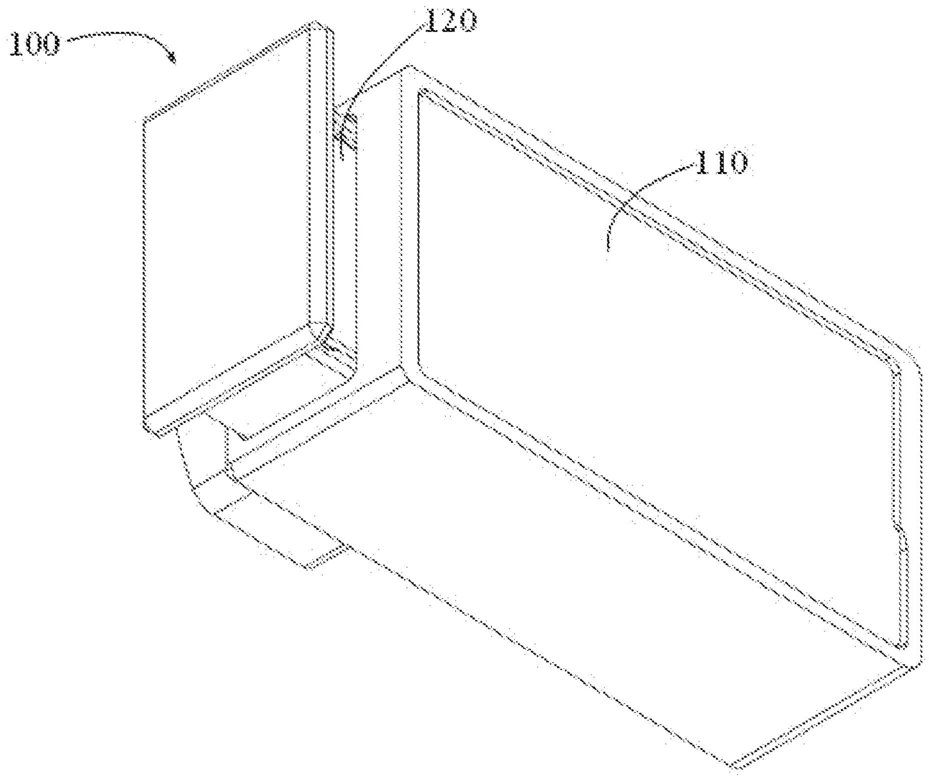
FIG. 6 is a schematic structural diagram of a check device with a base in a contracted state according to an embodiment of the present invention.

Referring to FIGS. 5 and 6 together, the base 100 comprises a first base body 110 and a second base body 120, and the check device body 200 is mounted to the first base body 110. The first base body 110 has a hollow structure, and at least part of the second base body 120 can be accommodated in an inner cavity of the first base body 110.

Figure 7:
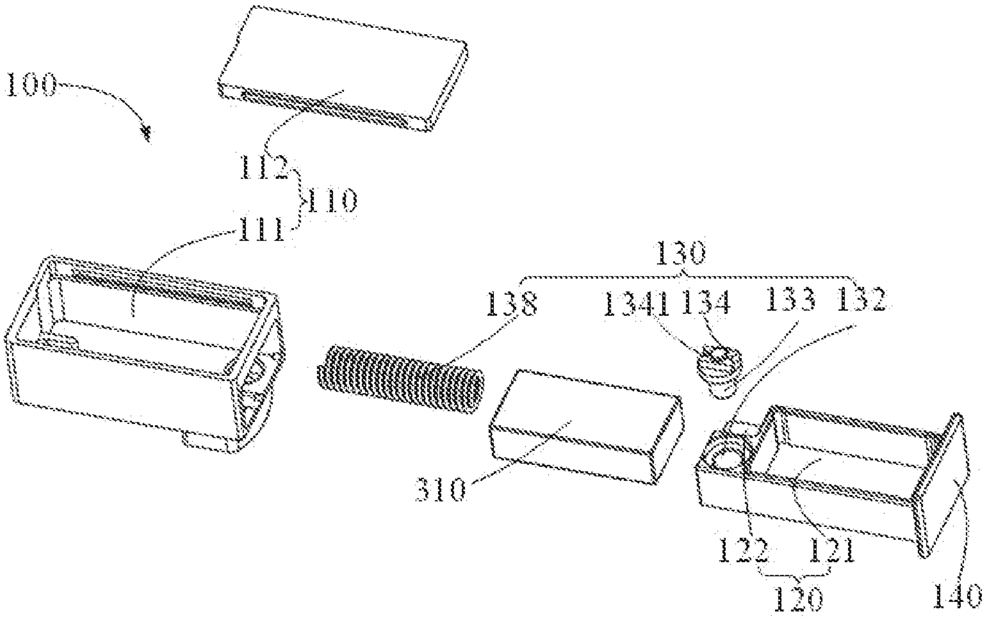
FIG. 7 is a schematic exploded diagram of the base shown in FIG. 6.

Referring to FIG. 7, the base 100 further includes a locking mechanism 130 for locking the second base body 120 with respect to the first base body 110 such that at least a portion of the second base body 120 is accommodated in the inner cavity of the first base body 110. The second base body 120 is unlocked with respect to the first base body 110 such that at least a portion of the second base body 120 extends out of the inner cavity of the first base body 110.

The first base body 110 includes a first sliding member 111 and an upper cover 112. The upper cover 112 covers the first sliding member 111, and the first sliding member 111 has a hollow structure. The second base body 120 includes a second sliding member 121. The first sliding member 111 cooperates with the second sliding member 121 so that the second base body 120 can move with respect to the first base body 110, and at least part of the second base body 120 can be accommodated in or can extend out of the inner cavity of the first base body 110.

Figure 8:
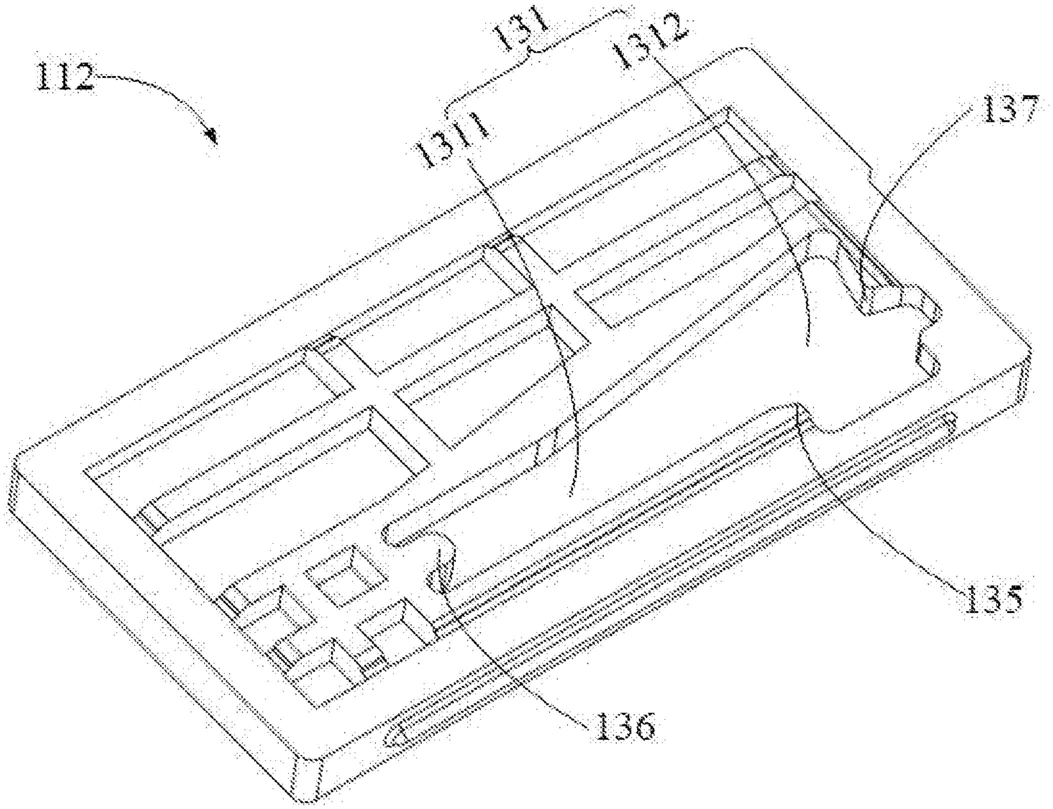
FIG. 8 is a schematic structural diagram of an upper cover in the base shown in FIG. 7.

Referring to FIG. 8, the locking mechanism 130 includes a track groove 131, a rotating groove 132, a rotating shaft 133, and a locking block 134.

The track groove 131 is provided on the inner surface of the upper cover 112, the rotating groove 132 is provided on the second sliding member 121, one end of the rotating shaft 133 is accommodated in the rotating groove 132, the rotating shaft 133 is rotatable with respect to the rotating groove 132, the locking block 134 is fixed to the other end of the rotating shaft 133, the locking block 134 is accommodated in the track groove 131, and the locking block 134 can move along the track groove 131 and rotate when the second base body 120 moves with respect to the first base body 110.

Figure 9:
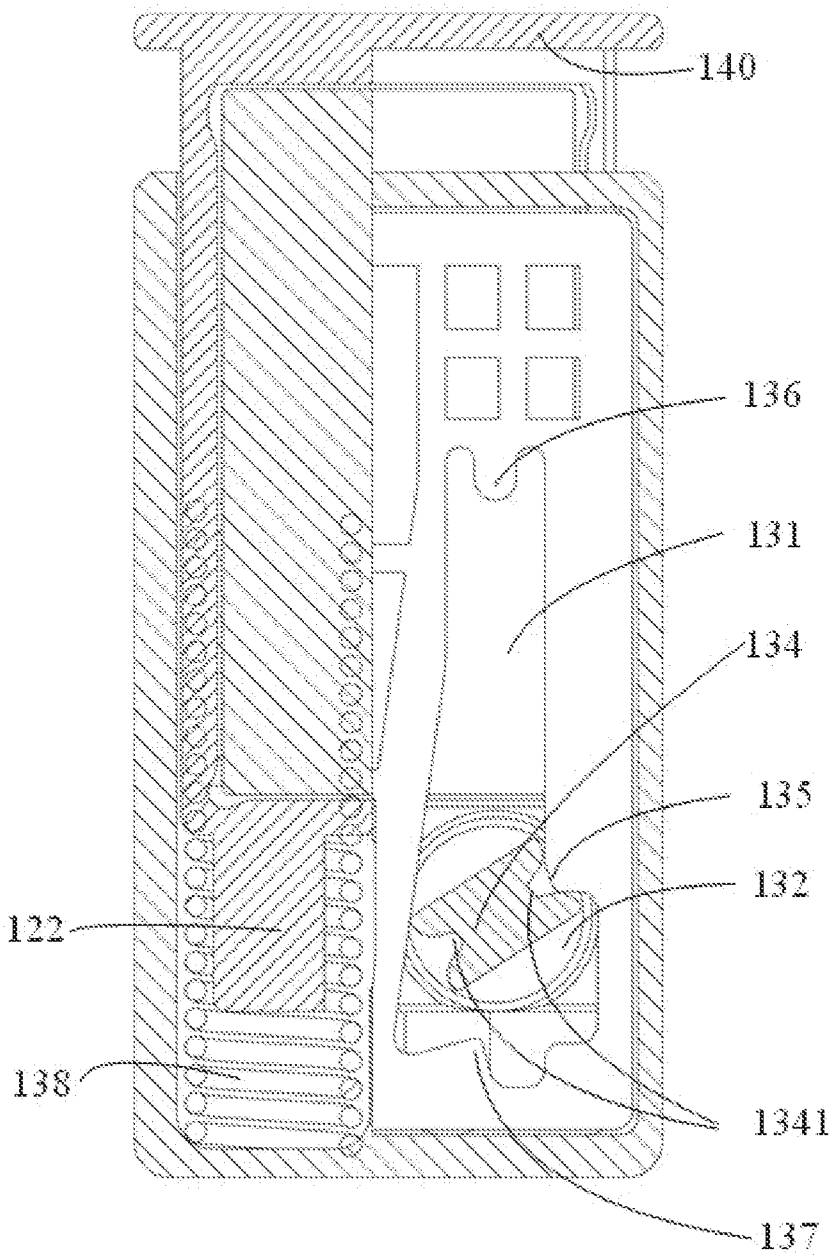
FIG. 9 is a sectional view of a base of the check device shown in FIG. 4 in a limit shrinkage state.

With reference to FIG. 9, the locking block 134 is provided with a locking groove 1341, and the upper cover 112 extends into the track groove 131 with a locking table 135. When the second base body 120 is accommodated in the inner cavity of the first base body 110 and the locking block 134 is inclined with respect to the track groove 131, and the locking groove 1341 is engaged with the locking table 135, the locking mechanism 130 locks the first base body 110 and the second base body 120, and the second base body 120 cannot protrude from the inner cavity of the first base body 110; when the locking groove 1341 is disengaged from the locking table 135 and the notch of the locking groove 1341 is rotated to a direction deviating from the locking table 135, the first base body 110 and the second base body 120 are unlocked so that the second base body 120 can protrude from the inner cavity of the first base body 110.

With continued reference to FIG. 8, the track groove 131 includes a guide groove 1311 and a rotating groove 1312. One end of the guide groove 1311 communicates with one end of the rotating groove 1312, the width of the rotating groove 1312 is greater than the width of the guide groove 1312, and the locking table 135 is formed at the junction of the rotating groove 1312 and the guide groove 1311.

One side face of the guide groove 1311 is an inclined plane to facilitate the movement of the locking block 134.

The upper cover 112 extends toward the track groove 131 with a boss 136, the boss 136 is located at one end of the guide groove 1311 away from the rotating groove 1312, the boss 136 is used for being engaged with the locking groove 1341, and when the boss 136 is engaged with the locking groove 1341, the second base body 120 is in an extreme extending position.

The number of the locking groove 1341 is two, and the two locking grooves 1341 are respectively located at two ends of the locking block 134.

Figure 14:
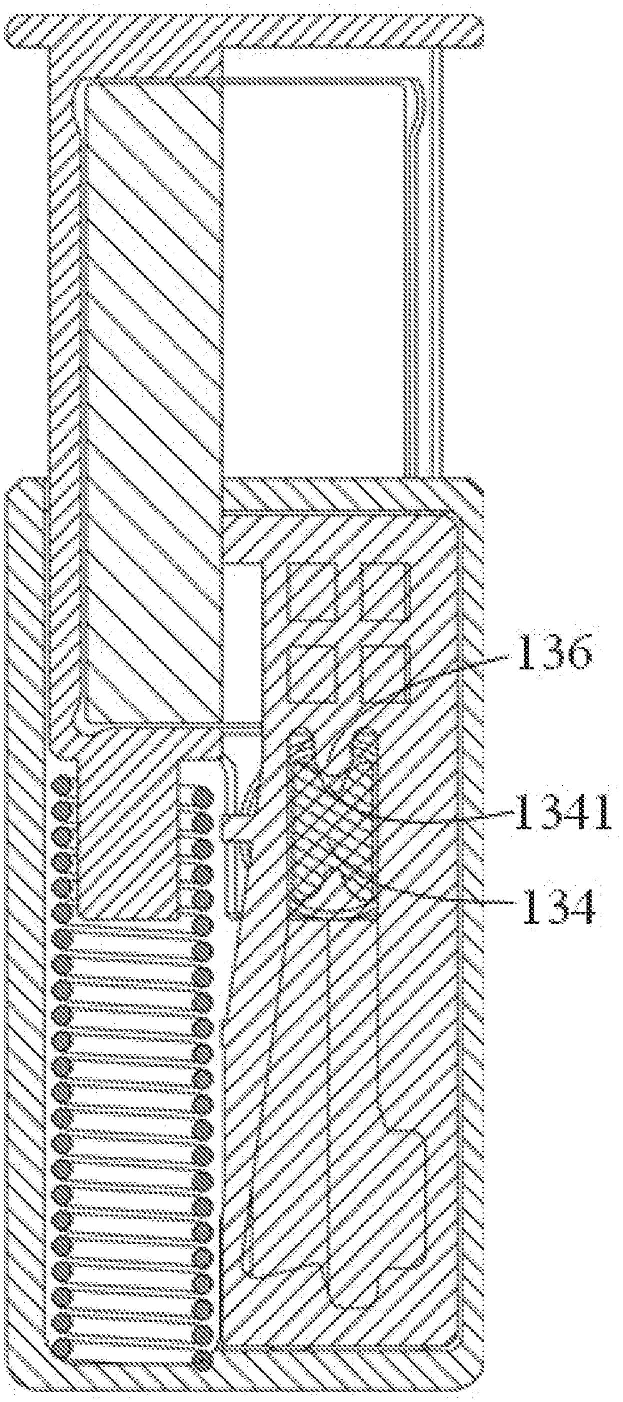
FIG. 14 is a schematic diagram showing that a locking block in the base shown in FIG. 13 is in a state in which the locking block moves to a locking groove to be engaged with a boss.

A boss 137 is provided at the bottom of the rotating groove 1312 such that when the locking block 134 moves from the extreme extending position to the bottom of the rotating groove 1312, the boss 137 abuts against the side wall of the locking groove 1341, as shown in FIG. 14.

Referring to FIGS. 7 and 9 together, the locking mechanism 130 further includes an elastic part 138. One end of the elastic part 138 abuts against the bottom of the first sliding member 111, and the other end of the elastic part 138 abuts against one end of the second sliding member 121 accommodated in the inner cavity of the first base body 110.

An end face of one end of the second base body 120 accommodated in the inner cavity of the first base body 110 is provided with a fixing column 122, and the other end of the elastic part 138 is sleeved on the fixing column 122.

The base 100 further includes a support plate 140 mounted at the other end of the second seat base body 120, and four end faces of the support plate 140 are flush with four side faces of the first sliding member 111, respectively. The support plate serves to press the second base body 120 so that the second base body 120 can move with respect to the first base body 110.

Figure 10:
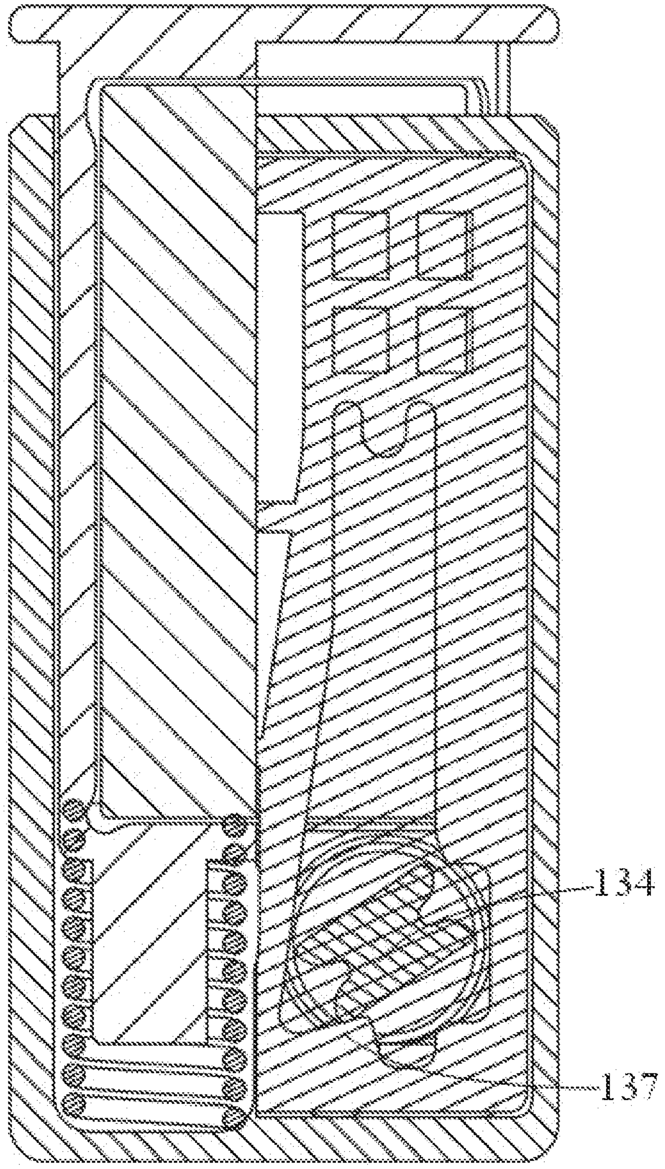
FIG. 10 is a sectional view of the base of FIG. 9 in which a locking block is moved into contact with a boss.
Figure 11:
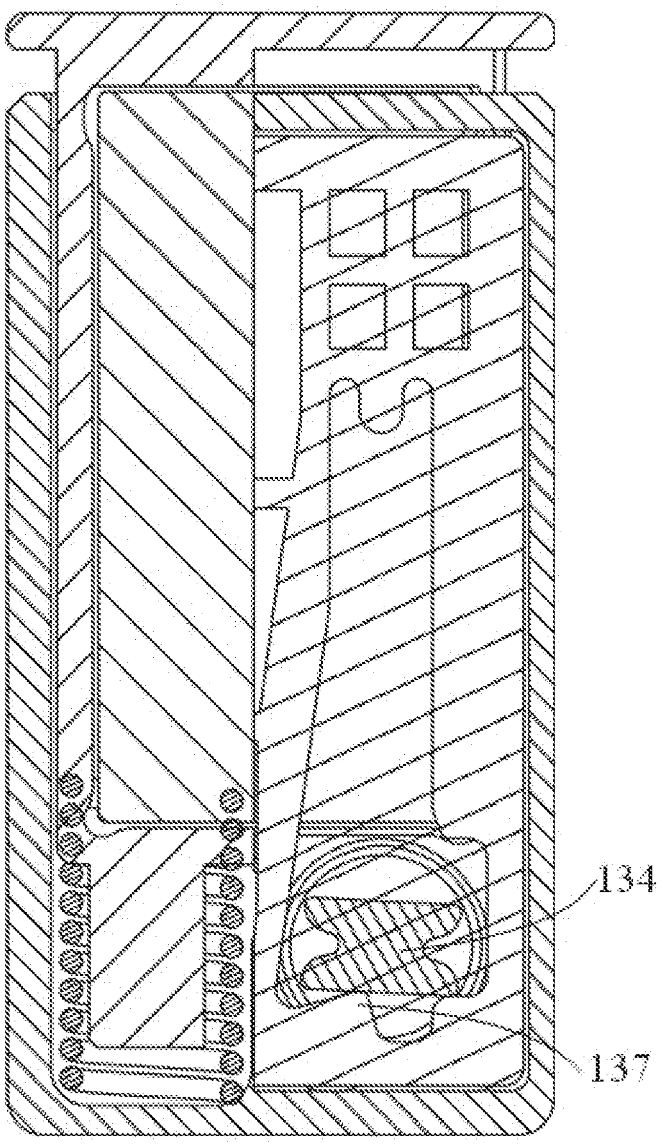
FIG. 11 is a schematic diagram showing that a locking block in the base shown in FIG. 10 is in a state in which the locking block moves to the bottom of the first base body and cannot rotate.
Figure 12:
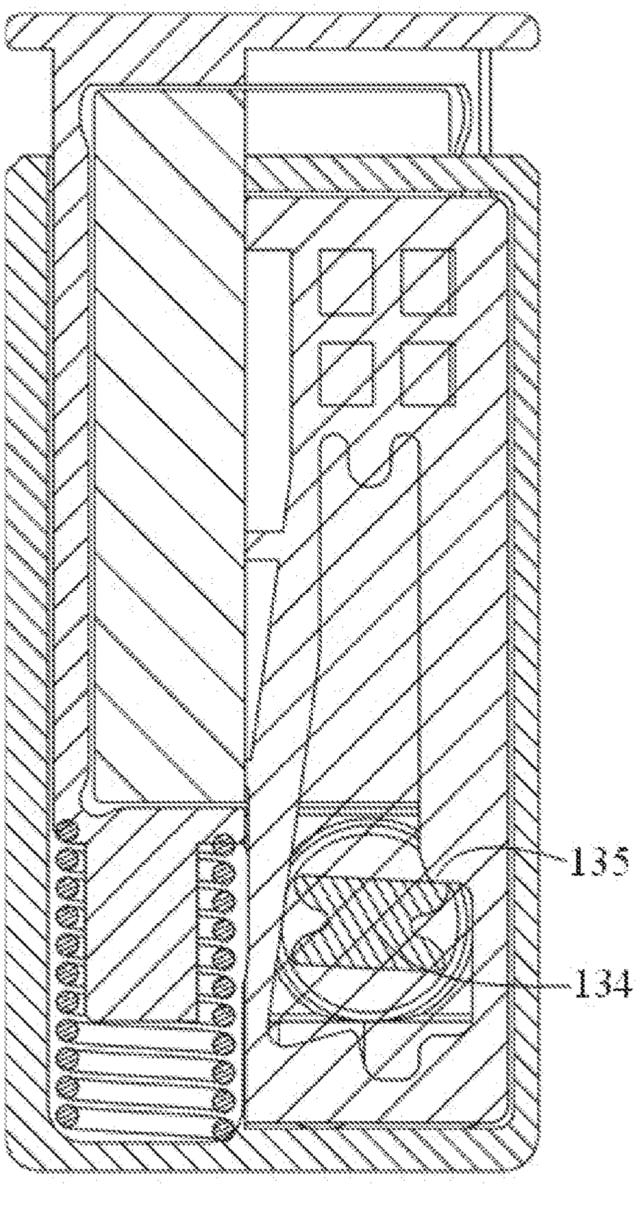
FIG. 12 is a schematic diagram showing that a locking block in the base shown in FIG. 11 is in a state in which the locking block moves to contact with a locking table under the action of an elastic part.
Figure 13:
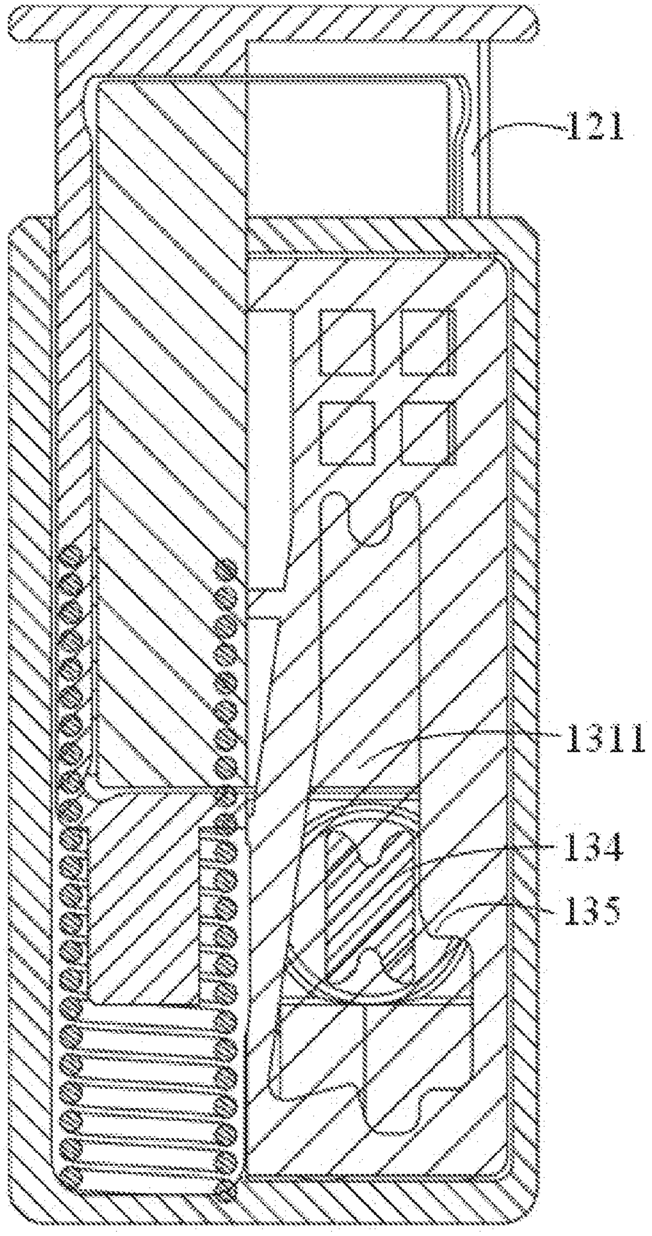
FIG. 13 is a schematic diagram showing that a locking block in the base shown in FIG. 12 is in a state in which the locking block is rotated under the action of a locking table until a side wall of the locking block is parallel to a guide groove.

During specific operations, initially, the first seat base body 110 is substantially completely accommodated in the second seat base body 120, as shown in FIG. 9, the support plate 140 is pressed, the second sliding member 121 drives the rotating shaft 133 to move in a direction away from the support plate 140, the elastic part 138 is compressed, and the locking block 134 rotates clockwise when pushed by the locking table 135 until the locking block 134 contacts the boss 137, as shown in FIG. 10; the support plate 140 continues to be pressed, and the boss 137 pushes the locking block 134 to continue to rotate clockwise until the locking block 134 cannot rotate, as shown in FIG. 11; the support plate 140 is released, and the second sliding member 121 and the locking block 134 move in a direction close to the support plate 140 under the resilience of the elastic part 138 until the locking block 134 contacts the locking table 135, as shown in FIG. 12; under the action of the elastic part 138, the locking table 135 pushes the locking block 134 to rotate clockwise until the side wall of the locking block 134 is parallel to the guide groove 1311, as shown in FIG. 13; the second sliding member 121 continues to protrude from the inner cavity of the first seat base body 110 under the action of the elastic part 138 while the locking block 134 moves along the guide groove 1311 under the action of the elastic part until the locking groove 1341 is engaged with the boss 136, and at this point, the second base body 120 is in the extreme extending position with respect to the first base body 110 and remains in this position, as shown in FIG. 14.

Figure 15:
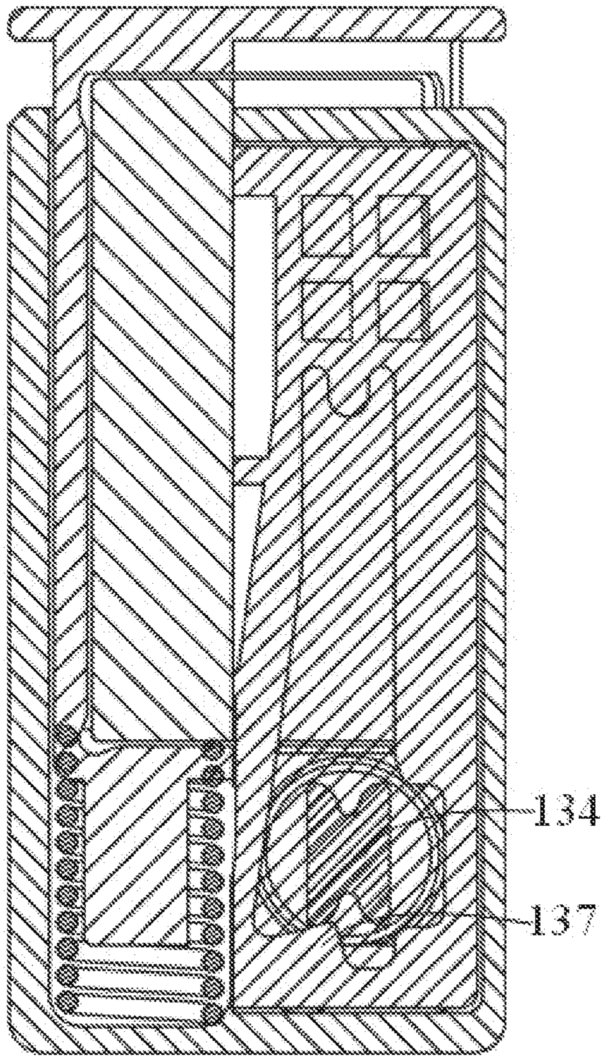
FIG. 15 is a schematic diagram showing that a locking block in the base shown in FIG. 14 is in a state in which the locking block moves to the bottom of the first base body.
Figure 16:
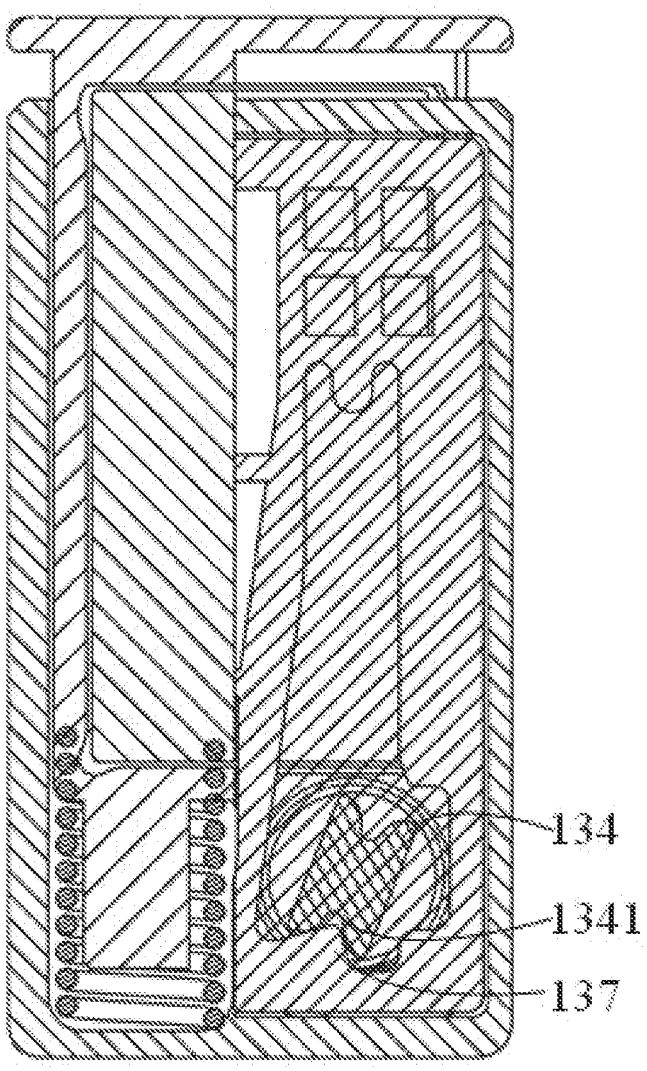
FIG. 16 is a schematic diagram showing that a locking groove of a locking block in the base shown in FIG. 15 is in a state in which the locking groove of the locking block is rotated to be engaged with the boss.
Figure 17:
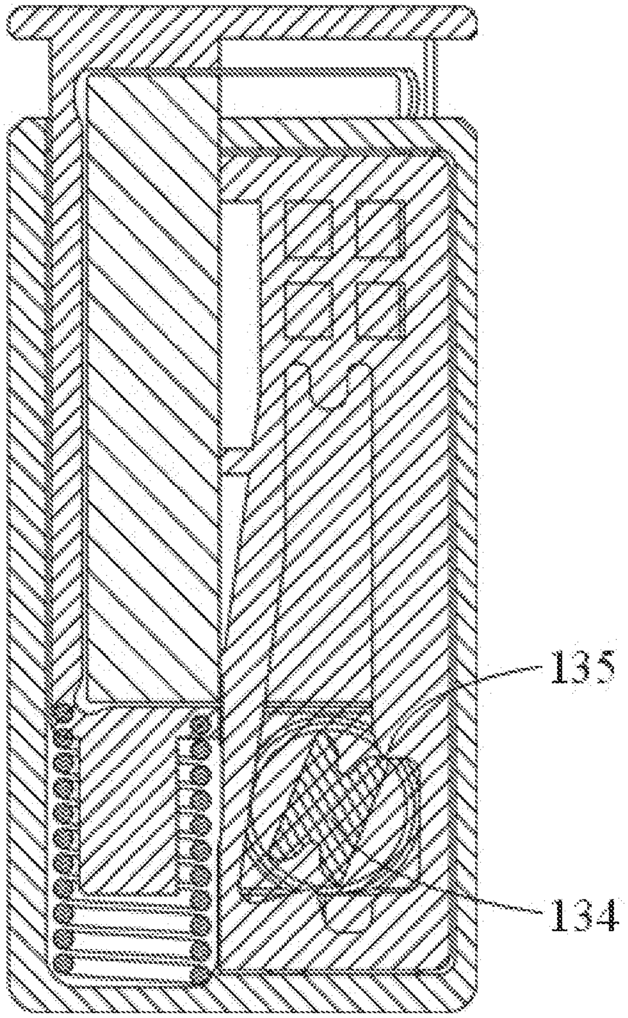
FIG. 17 is a schematic diagram showing that a locking block in the base shown in FIG. 16 is in a state in which the locking block, under the action of the resilience of an elastic part, moves to contact a locking table.
Figure 18:
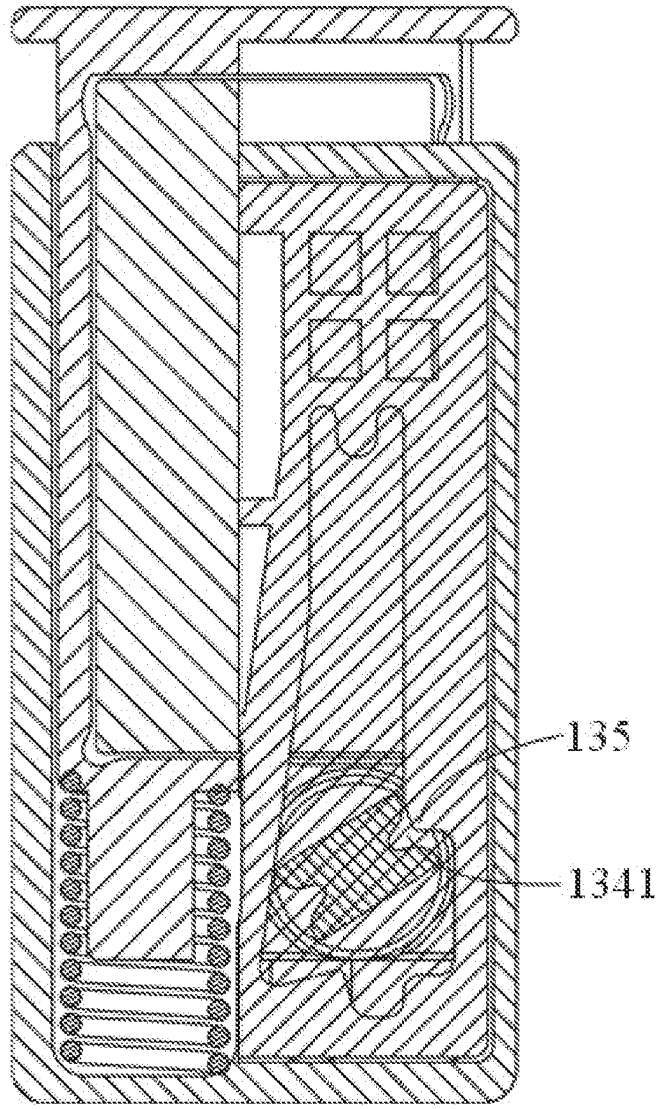
FIG. 18 is a schematic diagram showing a state in which the locking block shown in FIG. 17, under the action of a locking table, has a locking groove of the locking block rotate to be engaged with the locking tale.

When it is necessary to check the tread surface of the tire, the support plate 140 is pressed, and the second sliding member 121 and the locking block 134 move from the position shown in FIG. 14 to a position shown in FIG. 15; under the pressing of the support plate 140, the boss 137 pushes the locking block 134 to rotate clockwise until the boss 137 is engaged with the locking groove 1341 and the locking block 134 cannot rotate, as shown in FIG. 16; the support plate 140 is released, and the second sliding member 121 and the locking block 134 move in a direction close to the support plate 140 under the action of the elastic part 138 until the locking block 134 abuts against the locking table 135, as shown in FIG. 17; under the action of the elastic part 138, the locking table 135 pushes the locking block 134 to rotate clockwise until the locking table 135 is engaged with the locking groove 1341 and the locking block 134 cannot rotate, as shown in FIG. 18, and at this time, the second seat base body 120 is accommodated in the first seat base body 110 and remains in this position.

It needs to be noted that remaining in this position means that in the absence of an external force, the locking block 134 does not have any position offset.

Figure 19:
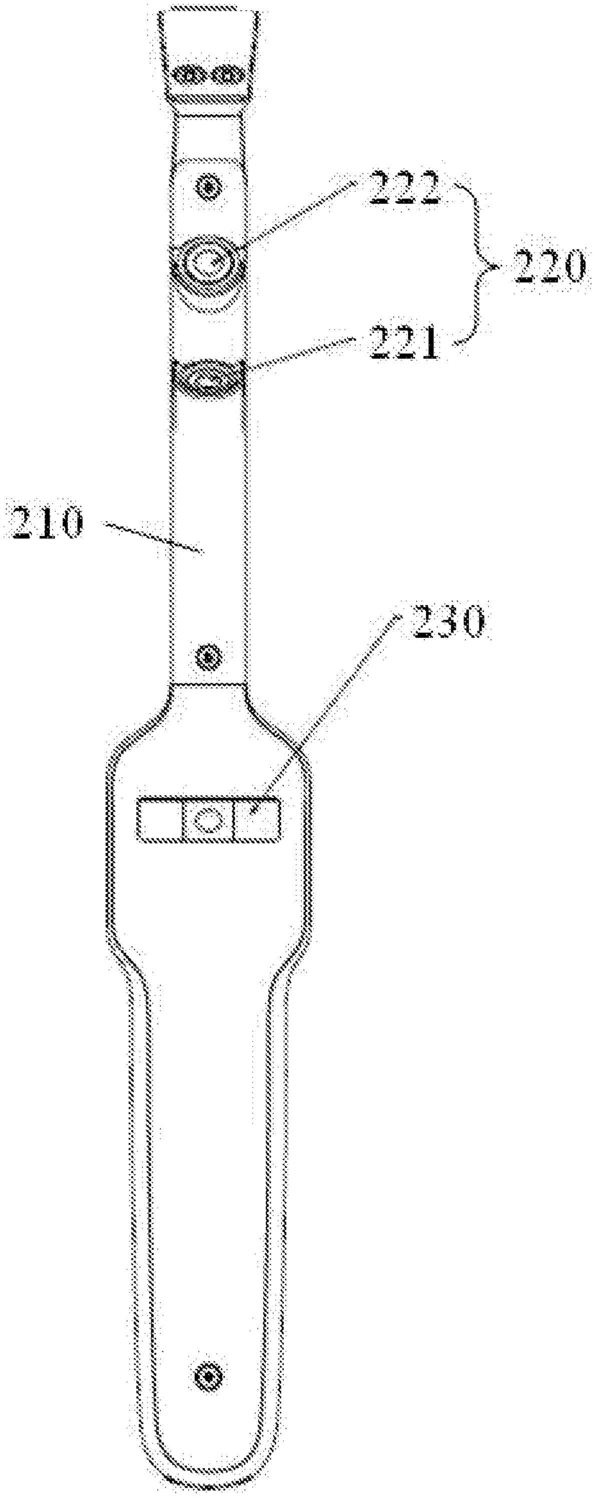
FIG. 19 is an overall schematic diagram of a check device.
Figure 20:
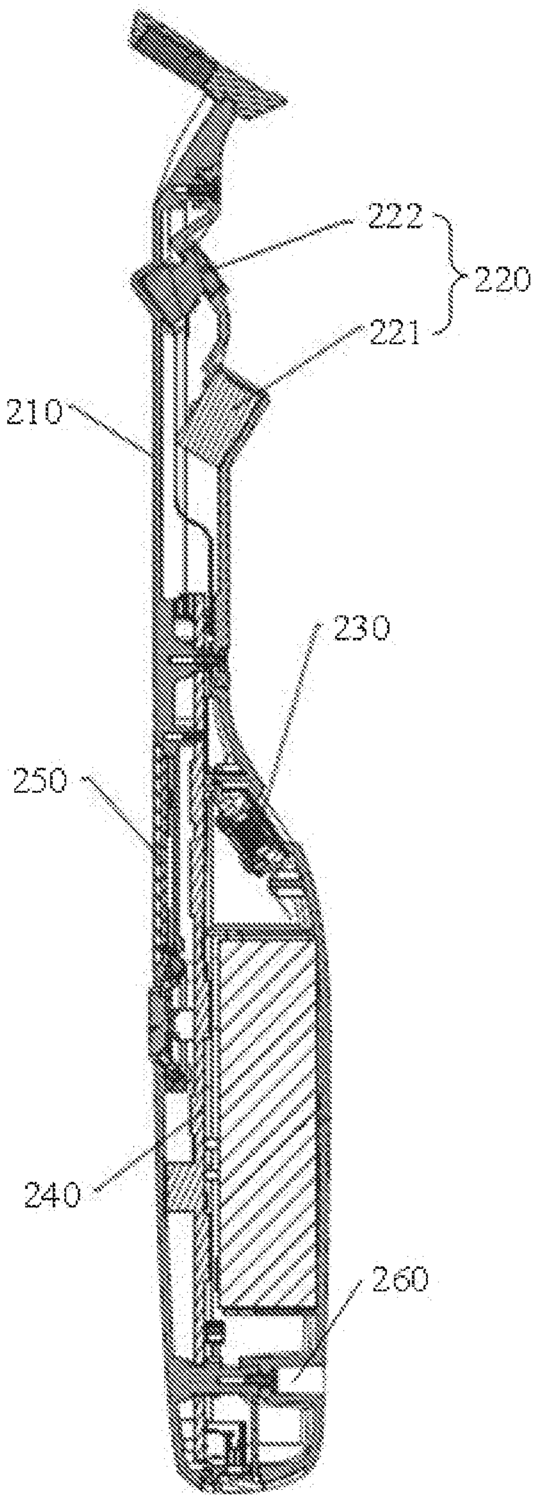
FIG. 20 is a sectional view of the check device shown in FIG. 19.

Referring to FIGS. 19 and 20 together, the check device body 200 includes a hand-held housing 210, a checking unit 220, a code reading unit 230, a control unit 240, and a display unit 250.

The checking unit 220, the code reading unit 230, the control unit 240, and the display unit 250 are all arranged on the hand-held housing 210, and the checking unit 220, the code reading unit 230, and the display unit 250 are respectively electrically connected to the control unit 240. At least one face of the checking unit 220 is arranged on the outer surface of the hand-held housing 210, the checking unit 220 emits a laser beam through the face to the outside of the hand-held housing 210, at least one face of the code reading unit 230 is arranged on the outer surface of the hand-held housing 10, the code reading unit 230 acquires external information about the hand-held housing 210 through the face, the control unit 240 is arranged in the hand-held housing 210, and the control unit 240 can be realized by means of a PCB board. The control unit 240 is fixed in the hand-held housing 210 means it is invisible.

The checking unit 220 is used for checking the brake disc of the vehicle or the tread surface of a tire so as to obtain wear measurement data of the brake disc or tread surface. The code reading unit 230 is used for collecting a coded image on the side face of the tire or collecting an image of vehicle information carried by the vehicle. The control unit 240 can recognize the code or the vehicle information according to the coded image or the image of the vehicle information, and further parse out characteristic information related to the brake disc or tread surface represented by the code or the vehicle information. The brake disc or tread surface related characteristic information is used to characterize a characteristic of the brake disc or tread surface or a characteristic of the vehicle to which the brake disc or tread surface belongs.

Further, the control unit 240 may further determine a wear replacement standard of the brake disc or tread surface based on the characteristic information of the brake disc or tread surface, and may further generate a wear diagnosis result based on the wear measurement data measured by the checking unit 220 and the wear replacement standard to determine whether the brake disc or tread surface needs to be replaced. The control unit 240 may include a plurality of processors, which may be provided integrally or distributedly. The checking unit 220 or the code reading unit 230 may be provided integrally with a processor, respectively, and the processor integrated with the checking unit 220 or the code reading unit 230 may perform functions such as image recognition.

The hardware of the control unit 240 may be existing hardware, for example: the Core processor by the Intel Corporation, the Ryzen processor by AMD, etc.

The display unit 250 is used for displaying the wear diagnosis result generated by the control unit 240, such as prompting whether the brake disc or tread surface needs to be replaced.

In an implementation mode, the checking unit 220 includes a photoelectric assembly 221 and an image capturing assembly 222, the control unit 240 controlling the photoelectric assembly 221 to emit a light beam to project the light onto a brake disc or tread surface, and the image capturing assembly 222 capturing an image containing the light.

In another implementation mode, the code reading unit 230 may capture light images in replacement with the image capture component 222. That is, the checking unit 220 includes only the photoelectric assembly 221.

Figure 21:
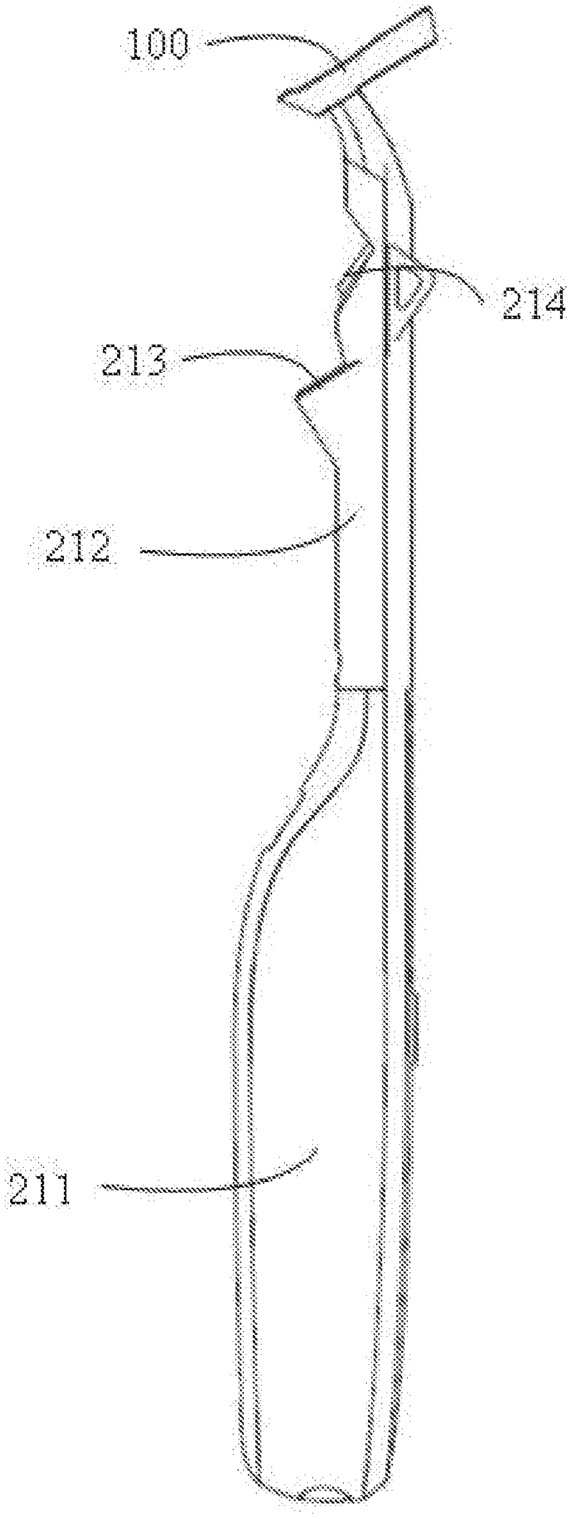
FIG. 21 is a side view of the check device shown in FIG. 19.

With regard to the above-mentioned hand-held housing 210, referring to FIG. 21, the hand-held housing 210 is divided into a hand-held end 211 and a checking end 212, the checking unit 220 is arranged at the checking end 212, and the code reading unit 230 is arranged at the hand-held end 211. The code reading unit 230 is arranged on the same side of the checking unit 240 or on a side facing away from the checking unit 240.

The hand-held housing 210 is mounted to the first base body 110. The first base body 110 is located at one end of the checking end 212 of the hand-held housing 10, and the first base body 110 and the second base body 120 are used for resting on the brake disc or tread surface when the check device 1000 performs measuring.

The hand-held housing 210 is provided with a first accommodating cavity 213 and a second accommodating cavity 214. The first accommodating cavity 213 and the second accommodating cavity 214 are spaced apart on the same side of the hand-held housing 210. A face of the first seat base body 110 away from the hand-held housing 210 is a smooth plane, the smooth plane of the first seat base body 110 away from the hand-held housing 210 is used for abutting against the brake disc or the tread surface, and the first accommodating cavity 213 and the second accommodating cavity 214 are used for accommodating the checking unit 220.

Figure 22:
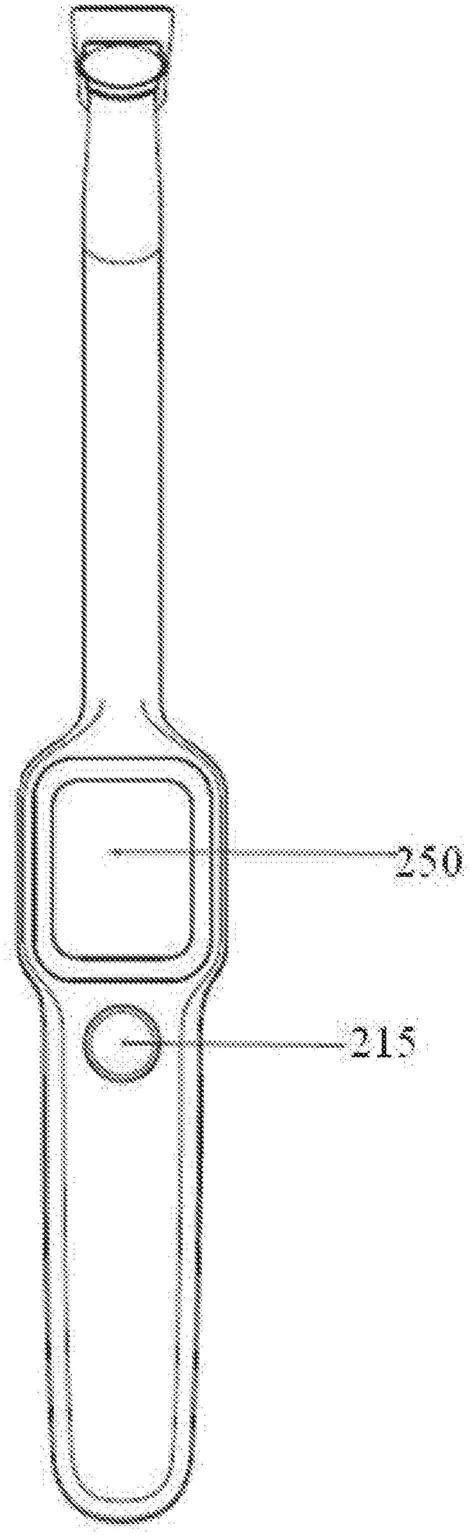
FIG. 22 is a rear view of the check device shown in FIG. 19.

Referring to FIG. 22, in some embodiments, the hand-held housing 210 is further provided with an activation key 215. The activation key 215 is connected to the checking unit 220, the code reading unit 230, and the control unit 240, respectively, and can be used to turn on or turn off the work of at least one of the checking unit 220, the code reading unit 230, the control unit 240, and the display unit 250. For example: a scenario that when the check device 1000 needs to check the brake disc or the tread surface, a user may check the brake disc or the tread surface by resting the base 100 of the check device 1000 on the surface of the brake disc or the tread surface and then quickly pressing the activation key 216 a single time. When the check device 1000 needs to perform information check reading on the tire or a vehicle, the user can perform information check reading on the tire or vehicle by aligning the code reading unit 230 with a tire or vehicle to be checked and then pressing the activation key 215 twice quickly.

In the present embodiment, the checking unit 220 includes a photoelectric assembly 221 and an image capturing assembly 222. The photoelectric assembly 221 is arranged in the first accommodating cavity 213, the image capturing assembly 222 is arranged in the second accommodating cavity 214, and the photoelectric assembly 221 and the image capturing assembly 222 are both electrically connected to the control unit 240. The photoelectric assembly 221 is used for emitting a light beam and projecting the light onto the brake disc or the tread surface, and the image capturing assembly 222 is used for capturing an image formed by the light emitted by the photoelectric assembly 221 and irradiated on the brake disc or the tread surface, namely, the image capturing assembly 222 is used for capturing an image containing the light on the brake disc or the tire. The control unit 240 is configured to recognize the information of the brake disc or the tire based on the image.

In some embodiments, the image capturing assembly 222 includes a prime lens (not shown). Since the distance from the image capturing assembly 222 to the base 100 is fixed, the use of a prime lens can quickly capture an image formed by the light emitted by the photoelectric assembly 221 and irradiated on the brake disc or the tread surface.

In some embodiments, the first accommodating cavity 213 and the second accommodating cavity 214 are provided at a predetermined angle to achieve a better arrangement of a preset included angle between a central axis of a light beam emitted by the photoelectric assembly 221 provided within the first accommodating cavity 213 and an optical axis of the image capturing assembly 222 provided within the second accommodating cavity 214. The optical axis of the image capturing assembly 222 is at a preset angle to the central axis of the light beam emitted by the photoelectric assembly 221, so that the image capturing assembly 222 can better capture an image formed by the light emitted by the photoelectric assembly 221 and irradiated on the brake disc or the tread surface.

In some embodiments, the central axis of the light beam emitted by the photoelectric assembly 221 is at right angles to the first base body 110 when the photoelectric assembly 221 is placed in the first accommodating cavity 213.

In some embodiments, in order to enhance the checking effect, the light beam emitted by the photoelectric assembly 221 is projected onto the brake disc or the tread surface to form a straight line parallel to the central axis of the brake disc or the tread surface.

In some embodiments, since the tires have different sizes, and since different tires have different sizes and the sizes of the areas of the coded information attached to the tires are different, the distances of the check device 1000 from the tires are different when the code reading unit 230 recognizes the coded information of the tire.

When the code reading unit 230 transmits the tire information image to the control unit 240, the control unit 240 parses the coded information image to obtain the corresponding information of the tire, for example: the tread width, the aspect ratio, the meridian, the size of a used wheel hub, the loading index, the speed, and the DOT information of the tire (manufacturer, manufacturer information, wear resistance index, traction index, high temperature resistance index, load-bearing mass, and tread wear index, etc.), then the control unit 240 transmits the corresponding information of the tire to the display unit 250 for a user to view, and meanwhile, the control unit 240 stores the tire information; after the check device 1000 checks the brake disc or the tread surface, calculation analysis is performed in combination with information about the tire to obtain an accurate tire wear condition, so as to judge whether the brake disc or the tire needs to be replaced, and the tire wear condition and judgement information are transmitted to the display unit 250 for a user to view.

In an embodiment of the invention, the field of view range of the image capturing assembly 222 is smaller than the field of view range of the code reading unit 230. The image capturing assembly 222 has a concentrated field of view to improve the accuracy of the capturing of images containing light, and the code reading unit 230 has a wide field of view to accommodate different ranges of codes on different tires imprinted on different tires.

The check device body also comprises a feedback unit 260. The feedback unit 260 is arranged in the hand-held housing 210, and the feedback unit 260 is electrically connected to the control unit 240. The control unit 240 controls the feedback unit 260 to output a prompt message after the control unit 240 completes the operation of the image transmitted from the image capturing assembly 222.

Specifically, the feedback unit 260 includes a vibration motor (not shown) and a buzzer (not shown), both of which are electrically connected to the control unit 240. The vibration motor prompts the user to perform different operation steps by generating a vibration and a buzzer beeps to prompt the user for different operation steps. For example: scenarios that the vibration of the vibration motor represents that the contact surface of the check device 1 with the brake disc or the tread surface is in poor contact, and the contact position of the first seat base body 110 with the brake disc or the tread surface needs to be readjusted; the buzzer beeps representing that the checking is not completed but the support base first seat base body 110 is separated from the brake disc or the tread surface.

The display unit 250 is electrically connected to the control unit 240 and the code reading unit 230. The display unit 250 and the photoelectric assembly 221 are oppositely arranged on two sides of the hand-held housing 210, namely: the display unit 250 is provided at one side of the hand-held housing 210, and the photoelectric assembly 221 and the image capturing assembly 222 are provided at the other side of the hand-held housing 210.

In an embodiment of the present invention, the display unit 250 is provided on one side of the hand-held housing 210 facing away from the first accommodating cavity 213 and the second accommodating cavity 214, and the code reading unit 230 is on the same side as the photoelectric assembly 221 and the image capturing assembly 222. The control unit 240 controls the feedback unit 260 to perform prompting after completing operation processing of the image from the image capturing assembly 222 or parsing the coded image from a code acquisition unit 230 or the image of the vehicle information; at the same time, combining the checked wear measurement data of the brake disc or tread surface and the parsed code or vehicle information, a wear diagnosis result is obtained; the wear diagnosis result is displayed on the display unit 250, for example: whether the tread surface or brake disc is replaced, the wear degree of tread surface or brake disc, the number of remaining safe driving kilometers, etc. Or the display unit 250 displays tire information, for example: the tread width, the aspect ratio, the meridian, the size of a used wheel hub, the loading index, the speed, and the DOT information of the tire (manufacturer, manufacturer information, wear resistance index, traction index, high temperature resistance index, load-bearing mass, tread wear index, etc.) Or the display unit 250 is used for displaying the video data filmed by the code reading unit 230 in real time. It is worth noting that the display unit 250 and the activation key 215 are provided on the same side of the hand-held housing 210.

In some embodiments, the display unit 250 may also be a touch-control display unit through which a user may operate the check device 1000 and then view the different parameters of the brake disc or tread surface through the display unit 250 or view the information about the tire through the display unit 250.

Figure 23:
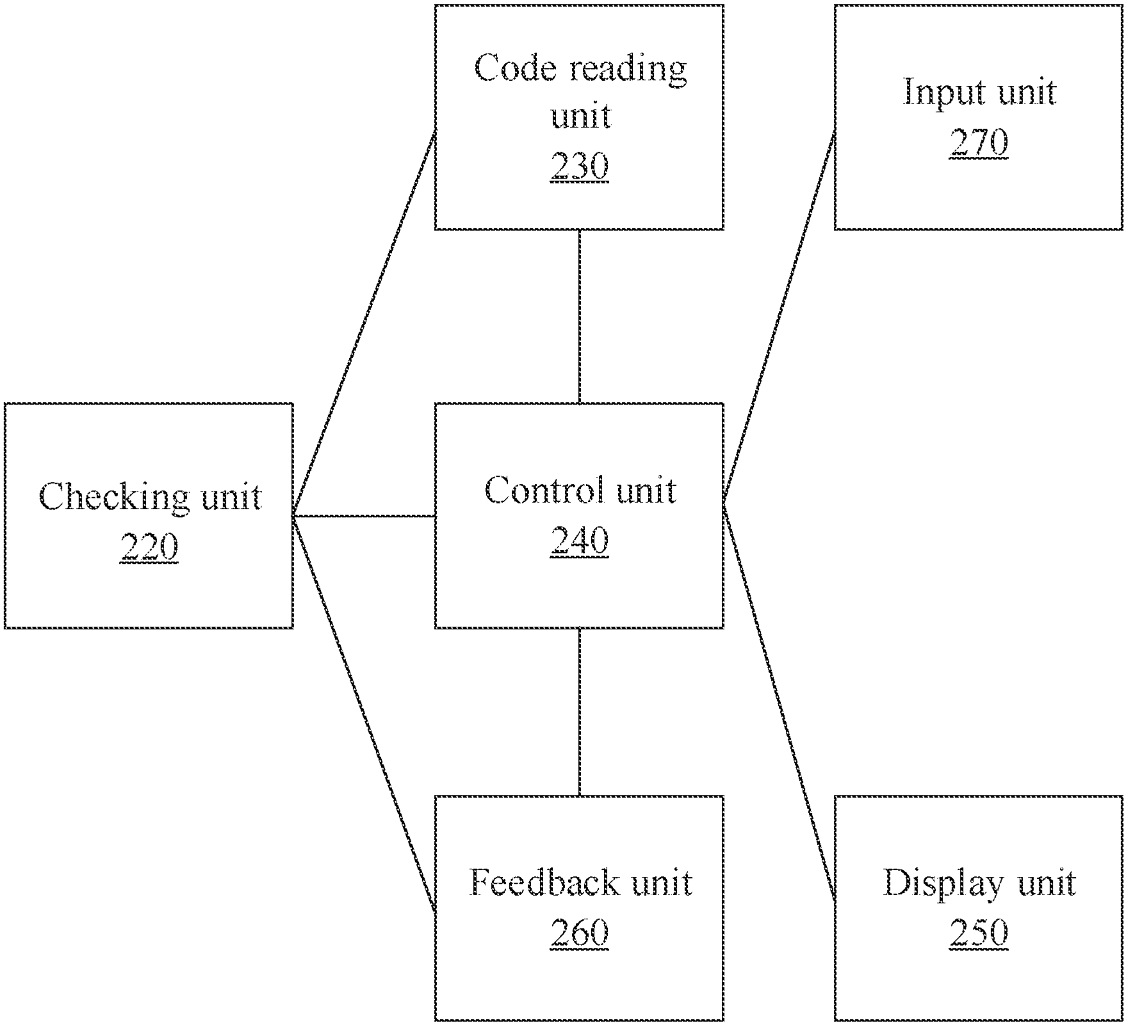
FIG. 23 is a schematic diagram of an application scenario of an embodiment of the check device of the present invention.

In some embodiments, referring to FIG. 23, the check device body 200 further comprises an input unit 270 electrically connected to the control unit 240 for accommodating a user-input instruction for instructing the control unit 240 to control the code reading unit 230 to collect the coded image from the video data. After the user views the video data provided by the code reading unit 230 in real time via the display unit 250, the user inputs an instruction to the input unit 270 because the image information is worn out or the image information cannot be understood; the input unit 270 instructs the control unit 240 to parse the image acquired by the code reading unit 230 according to the instruction to acquire the tire data, then the control unit 240 transmits the parsed tire data to the display unit 250 according to a predetermined format, and the parsed tire data is displayed by the display unit 250 for the user to view.

In some embodiments, the check device body is further provided with a power supply unit (not shown) provided in the hand-held housing 210, the power supply unit being connected to the photoelectric assembly 221, the image capturing assembly 222, the control unit 240, and the feedback unit 260, respectively.

In order to facilitate a user's understanding of the inventive concept of the present invention, the checking process of the checking equipment is illustrated below by taking a tire as an example.

Figure 24:
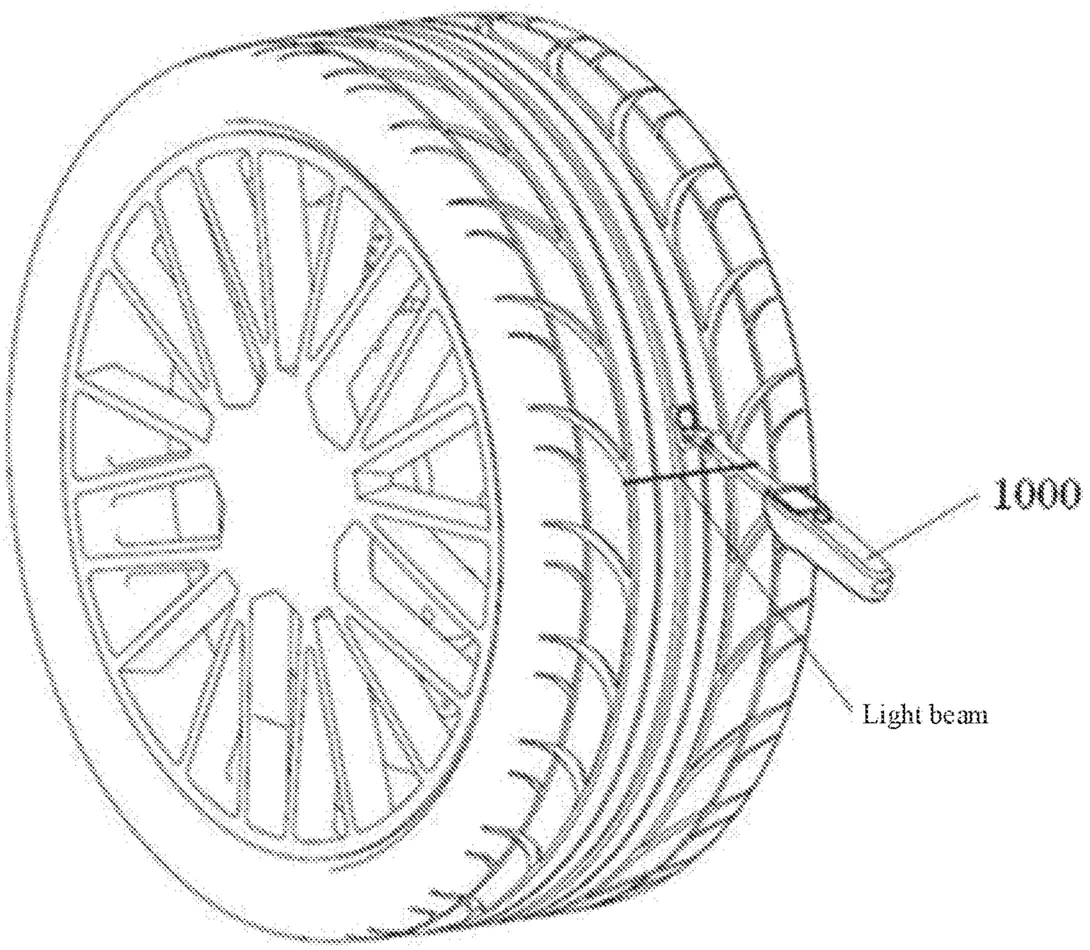
FIG. 24 is a schematic diagram of an electrical connection of the check device body of the present invention.

As shown in FIG. 24, the first base body 110 of the check device 1000 abuts against the surface of the tire, then the check device 1000 is activated by an activation key 215, the control unit 240 controls the photoelectric assembly 221 to emit a light beam to the tire, the image capturing device 222 captures an image of emitted from the photoelectric assembly 221 to the tire and transmits the captured image to the control unit 240, and the control unit 240 performs operation processing according to the image transmitted from the image capturing assembly 222 to obtain the state of wear of the tire.

Figure 25:
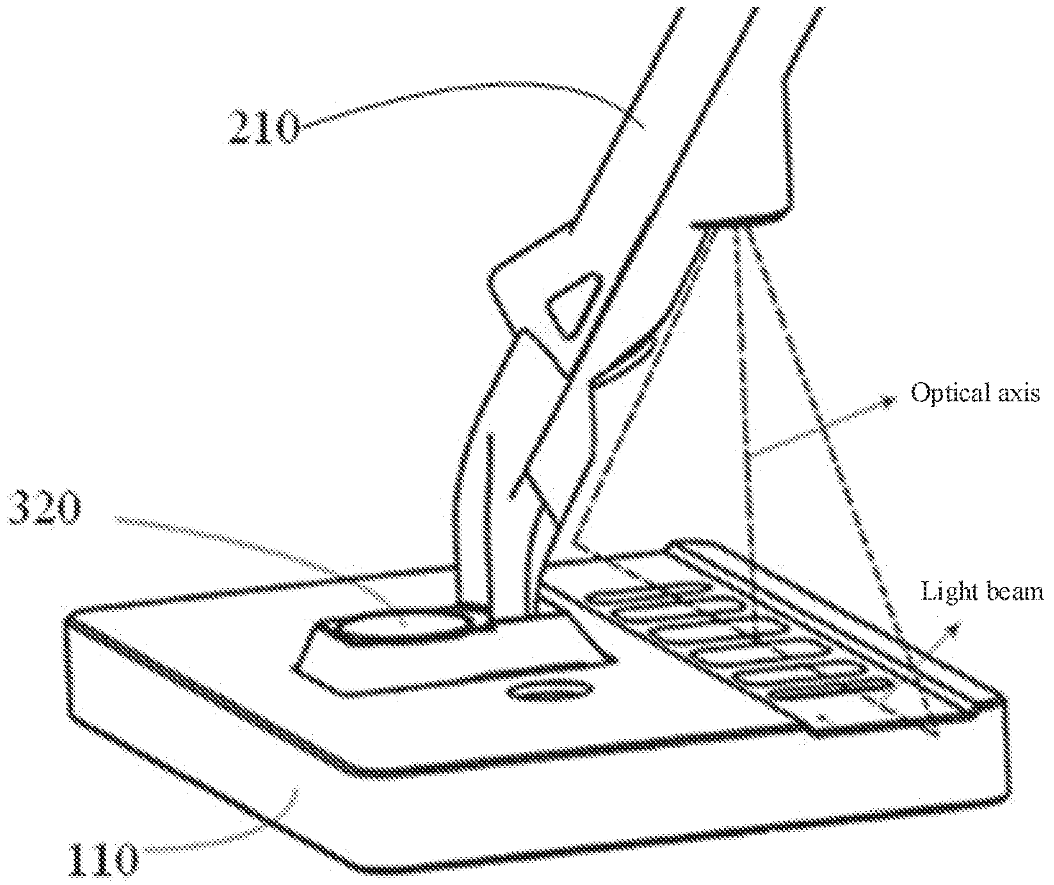
FIG. 25 is a schematic diagram of the mounting of a check device body and a base.

In some embodiments, referring to FIG. 25, the check device 1000 further comprises a magnetic absorbing unit comprising a first magnetic absorbing member 310 (see FIG. 7) and a second magnetic absorbing member 320. The first base body 110 is provided with a mounting groove (not shown) in which one end of the hand-held housing 210 is accommodated. The second seat base body 120 is further provided with an accommodating cavity (not shown); the first magnetic absorbing member 310 is mounted in the accommodating cavity; the second magnetic absorbing member 320 is mounted to one end of the hand-held housing 210; when one end of the hand-held housing 210 is accommodated in the mounting groove, the first magnetic absorbing member 310 and the second magnetic absorbing member 320 are attracted to each other.

An embodiment of the present invention provides a check device. By configuring a telescopic base 100, the base 100 can be in two different states to cooperate with the use of the check device body 200, which can check the tire tread and brake disc in two different use scenarios without replacing the base, thereby ensuring the stability of the base 100 support and the accuracy of the measurement of the check device 1000.

Finally, it should be noted that: the above embodiments are merely illustrative of the technical solutions of the present invention, rather than limiting it; combinations of technical features in the above embodiments or in different embodiments are also possible under the idea of the present invention, and the steps can be implemented in any order; there are many other variations of the different aspects of the present invention as described above, which are not provided in detail for the sake of brevity; although the present invention has been described in detail with reference to the foregoing embodiments, those of ordinary skills in the art will appreciate that the technical solutions disclosed in the above-mentioned embodiments can still be modified, or some of the technical features thereof can be replaced by equivalents; such modifications or replacements do not depart the essence of the corresponding technical solution from the scope of the technical solutions of embodiments of the present invention.

The invention claimed is:

1. A check device for checking a brake disc and a tire tread surface of a vehicle, wherein the check device comprises: a check device body; and a base comprising a first base body, a second base body, and a locking mechanism, wherein the check device body is mounted to the first base body;

wherein the first base body has a hollow structure, and at least part of the second base body can be accommodated in an inner cavity of the first base body;

the first base body comprises a first sliding member, the second base body comprises a second sliding member, the first sliding member cooperates with the second sliding member to move the second base body with respect to the first base body, and the at least part of the second base body can be accommodated in or can extend out of the inner cavity of the first base body;

the locking mechanism is used for locking the second base body with respect to the first base body such that the at least part of the second base body is accommodated in the inner cavity of the first base body, and unlocking the second base body with respect to the first base body such that the at least part of the second base body extends out of the inner cavity of the first base body;

wherein the first base body comprises an upper cover, and the upper cover is covered on the first sliding member;

the locking mechanism comprises a track groove, a rotating groove, a rotating shaft, and a locking block; and wherein the track groove is provided on an inner surface of the upper cover, the upper cover extends into the track groove with a locking table, the rotating groove is provided on the second sliding member, one end of the rotating shaft is accommodated in the rotating groove, the rotating shaft can rotate with respect to the rotating groove, the locking block is fixed to the other end of the rotating shaft, the locking block is provided with a locking groove, the locking block is accommodated in the track groove, and when the second base body moves with respect to the first base body, the locking block can move along the track groove and rotate.

2. The check device according to claim 1, when the second base body is accommodated in the inner cavity of the first base body and the locking block is inclined with respect to the track groove and the locking groove is engaged with the locking table, the locking mechanism locks the first base body and the second base body, and the second base body cannot protrude from the inner cavity of the first base body; when the locking groove is disengaged from the locking table and a notch of the locking groove is rotated to a direction deviating from the locking table, the first base body and the second base body are unlocked so that the second body can protrude from the inner cavity of the first body base.

3. The check device according to claim 2, wherein the track groove comprises a guide groove and a rotating groove; an end of the guide groove is in communication with an end of the rotating groove, a width of the rotating groove is greater than the width of the guide groove, and the locking table is formed at a connection of the rotating groove and the guide groove.

4. The check device according to claim 3, wherein a side face of the guide groove is an inclined plane.

5. The check device according to claim 3, wherein the upper cover extends towards the track groove with a boss, the boss is located at the other end of the guide groove away from the rotating groove, the boss is used for engaging with a locking groove, and when the boss is engaged with the locking groove, the second base body is in an extreme extending position.

6. The check device according to claim 5, wherein the number of the locking grooves is two, and the two locking grooves are respectively located at two ends of the locking block.

7. The check device according to claim 6, wherein a boss is provided at a bottom of the rotating groove, and when the locking block moves from the extreme extending position to the bottom of the rotating groove, the boss abuts against a side wall of the locking groove.

8. The check device according to claim 2, wherein the locking mechanism further comprises an elastic part;

one end of the elastic part abuts against the bottom of the first sliding member, and the other end of the elastic part abuts against one end of the second sliding member accommodated in the inner cavity of the first base body.

9. The check device according to claim 8, wherein an end face of one end of the second base body accommodated in the inner cavity of the first base body is provided with a fixing column, and the other end of the elastic part is sleeved on the fixing column.

10. The check device according to claim 1, further comprising a support plate: wherein the support plate is mounted to the other end of the second base body, and four end faces of the support plate are flush with four side faces of the first sliding member, respectively.

11. The check device according to claim 1, wherein the check device body comprises a hand-held housing, a photoelectric assembly, an image capturing assembly, and a control unit; the control unit, the photoelectric assembly, and the image capturing assembly are all arranged on the hand-held housing, the control unit is electrically connected to the photoelectric assembly and the image capturing assembly respectively, and one end of the hand-held housing is mounted to the first base body;

wherein the first base body and the second base body are used for abutting against a brake disc or the tire, the photoelectric assembly is used for projecting light onto the brake disc or the tire, the image capturing assembly is used for capturing an image containing the light on the brake disc or the tire, and the control unit is used for recognizing information about the brake disc or the tire according to the image.

12. The check device according to claim 11, wherein the first base body is provided with a mounting groove in which one end of the hand-held housing is accommodated.

13. The check device according to claim 12, wherein the second base body is further provided with an accommodating cavity;

the check device further comprises a first magnetic absorbing member and a second magnetic absorbing member, wherein the first magnetic absorbing member is mounted in an accommodating cavity, the second magnetic absorbing member is mounted to one end of the hand-held housing, and one end of the hand-held housing is accommodated in the mounting groove, the first magnetic absorbing member and the second magnetic absorbing member being attracted to each other.

* * * * *